United States Patent [19]
Swanson

[11] 3,770,979
[45] Nov. 6, 1973

[54] PROJECTOR SLIDE ADVANCE TIMER
[75] Inventor: Allen K. Swanson, Walpole, Mass.
[73] Assignee: Hamton Engineering Associates Inc., Norwood, Mass.
[22] Filed: Oct. 16, 1972
[21] Appl. No.: 297,780

[52] U.S. Cl. .................................. 307/141, 353/25
[51] Int. Cl. ............................................ H01h 7/00
[58] Field of Search.............. 307/141, 141.4, 141.8; 353/107, 25

[56] References Cited
UNITED STATES PATENTS
3,151,523  10/1964  King.................................. 307/141.4
3,217,595  12/1965  Gallina.............................. 353/107

Primary Examiner—Robert K. Schaefer
Assistant Examiner—M. Ginsburg
Attorney—David M. Driscoll

[57] ABSTRACT

An adapter for insertion into the remote function receptacle of a conventional slide projector to receive operating power therefrom and for enabling continuous and automatic slide advancement having a variable timing adjustment for controlling the time interval between slides. The slide projector is preferably of the carousel-type, and the adapter may include a microswitch responsive to the position of the carousel for interrupting the automatic slide advancement at one or more positions of the carousel.

22 Claims, 4 Drawing Figures

PROJECTOR SLIDE ADVANCE TIMER

BACKGROUND OF THE INVENTION

The present invention relates in general to timing adapters for use with slide projectors preferably of the carousel type. More particularly, the present invention is concerned with an adapter including a timer means and preferably for insertion into the remote function receptacle, or other like connector means, of the projector for providing automatic slide advancement on a variable time basis. It is also preferred that the adapter receive operating power via the remote function receptacle thus obviating the need for its own power source.

For many visual presentations using a slide projector, especially in the presentation of visual displays in association with a lecture, for example, it is often desirable to be able to advance the slides in a continuous and automatic manner. There are presently available relatively expansive slide projectors having a build-in timer. These timers, however, do not provide a satisfactory timing range, and usually these projectors, which combine features which are not always necessary, are quite expensive in comparison to the usual projector for normal home use. Also, with presently existing slide projectors such as the one made by Kodak once the projector has been purchased without providing an automatic repetitive timer it is not possible to easily adapt the projector for such operation.

Accordingly, one important object of the present invention is to provide a timing adapter for use in conjunction with a slide projector for providing automatic and continuous slide advancement.

Another object of the present invention is to provide an adapter in accordance with the preceding object and that is preferably adapted to be received by the remote function receptacle of the slide projector.

A further object of the present invention is to provide an adapted in accordance with the preceding objects wherein the adapter receives operating power by way of the remote function receptacle, or other like connector means, thus obviating the need for its own power source.

Still another object of the present invention is to provide a timing adapter for use with a slide projector for providing automatic and continuous slide advancement and including means for adjusting the time interval between slides.

Still a further object of the present invention is to provide a timing adapter for use with a slide projector wherein the adapter includes a first switch means responsive to the position of the carousel for interrupting the operation of the timer of the adapter at at least one position of the carousel. A second switch means may also be provided and may be remotely disposed for restarting the timer for continuous and automatic operation.

Another object of the present invention is to provide a relatively small electronic solid state timer which is received in the remote function receptacle of the projector, that is easily used with existing slide projectors, that is compact, that is relatively inexpensive to manufacture, and that may be easily modified, if need be, to fit different types of slide projectors.

SUMMARY OF THE INVENTION

To accomplish the foregoing and other objects of the present invention, there is provided for a slide projector, an adapter received by a remote function receptacle, or the like connector means, of the projector for providing automatic slide advancement. This adapter generally comprises a timer means defining a predetermined time period, means coupled to the connector means for providing power therefrom to the timer means, means for adjusting the duration of the predetermined time period, and means coupled to the connector means or receptacle and responsive to termination of the time period for providing a signal to the appropriate means of the projector to thereby cause a slide advance. This adapter may include a switch for enabling the timer means of the adapter when the adapter is inserted into the projector, and the timer means may include an exponential charging circuit and associated electronic shunting means for facilitating the slide advance of the projector.

In accordance with another aspect of the present invention there is provided, for use preferably with a carousel-type slide projector, an adapter received by the remote function receptacle, or the like connector means of the projector for providing automatic slide advancement. In accordance with this embodiment of the invention, the adapter includes a cyclical timer means defining a predetermined time period, means for adjusting the duration of the time period, first switch means responsive to the position of the carousel for interrupting operation of the timer at at least one position of the carousel, and second switch means for restarting the timer. The first switch means may be responsive to two or more positions of the carousel and these responsive positions may be changed. Also, the second switch means may be remotely disposed via appropriate interconnecting lines to the adapter.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

Figure 1:
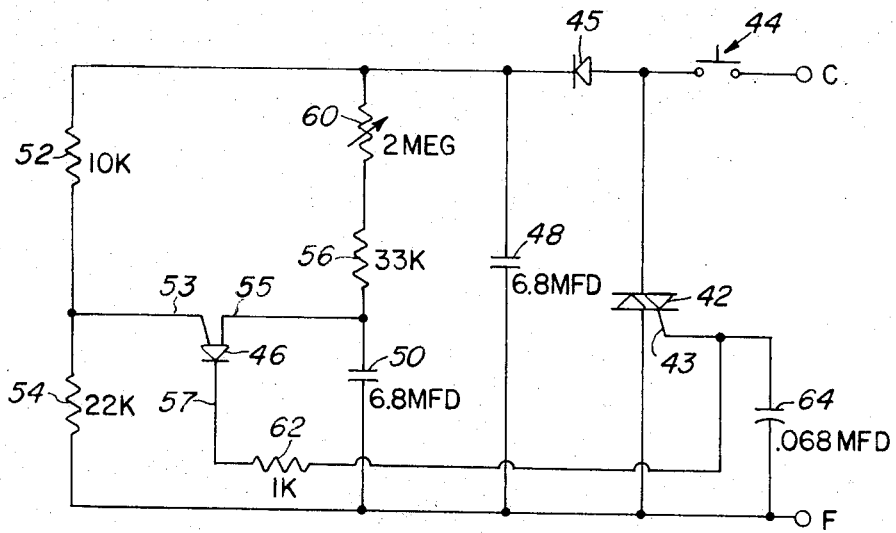
FIG. 1 is a circuit diagram of a timing adapter constructed in accordance with the principles of the present invention.
Figure 3:
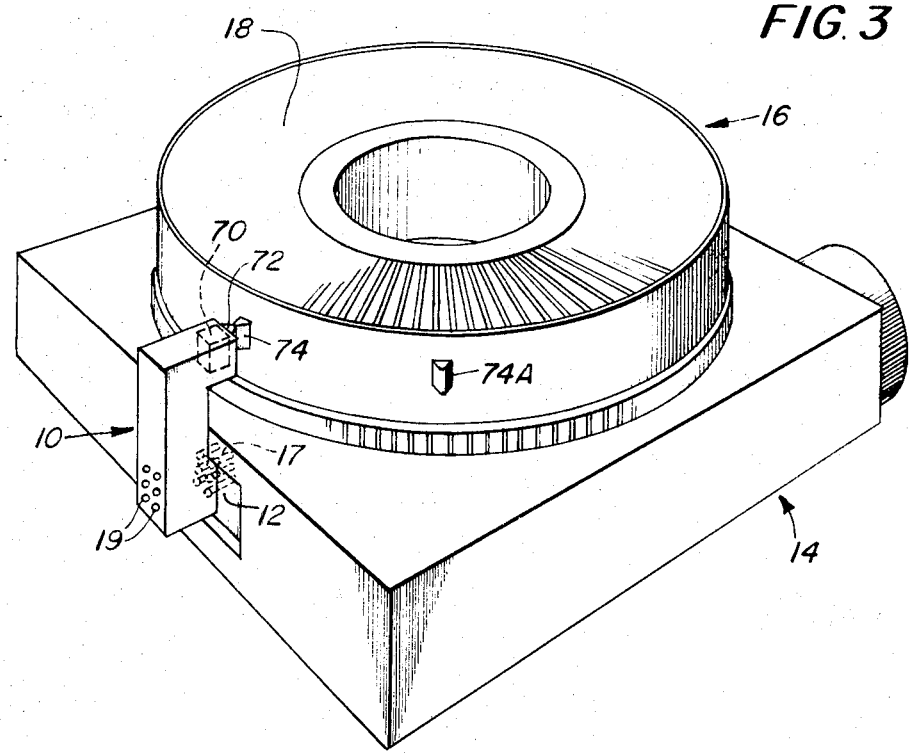
FIG. 3 is a diagrammatic perspective view of a typical slide projector carrying the adapter of the present invention and showing means disposed on the carousel for activating a microswitch of the adapter.

Referring now to the drawings, and in particular to FIG. 1, there is shown a circuit diagram of the adapter 10 of the present invention. In FIG. 3 this adapter is shown inserted into a remote function receptacle 12 of a typical slide projector 14 which may be a Kodak carousel-type slide projector model 700. The slide projector typically has a carousel 16 associated therewith for spacedly holding a plurality of slides 18 therein. The adapter 10 may be contained in a relatively small plastic housing, and the adapter further includes a plurality of plugs 17 which connect to female contacts of receptacle 12. At least two of these plugs are used to couple power to the circuitry of the adapter from circuitry contained in the projector 14. In FIG. 1 the power from the projector is coupled to terminals C and F.

Figure 2:
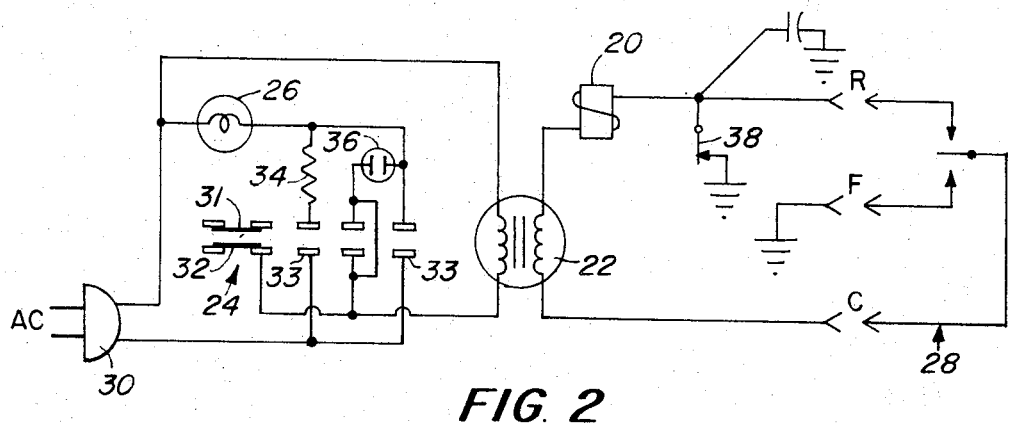
FIG. 2 is a schematic circuit diagram of the slide advance control circuitry of a typical slide projector such as the Kodak model 700 slide projector.

In FIG. 2 there is shown a circuit schematic diagram of the circuit means in the projector 14 for providing both reverse and forward remote slide advancement. The circuitry of FIG. 2 comprises a slide advance solenoid 20, a drive motor 22, a slide switch 24, a lamp 26, and a remote switch 28. AC power is coupled by way of plug 30 to lamp 26 and slide switch 24. Slide switch 24 is shown in its off position and is slidable so that the bars 31 and 32 move, in unison, to different sets of contacts 33. As the switch bars 31 and 32 are manually moved to the right, the following operation is provided in sequence; (1) the motor 22 is enabled for operation, (2) the lamp 26 is operated at a predetermined light level limited by resistor 34, and (3) the lamp 26 is operated at full light level, the motor 22 is enabled and power is provided to the accessory receptacle 36. The receptacle 36 may be used for providing power to other A-C operated means not shown in the drawings of the present application.

Typically, when the remote switch 28 is moved to its "forward" position a short circuit is provided across terminals F and C thereby causing the projector to forward slide advance. Alternatively, a closure across terminals C and R causes the projector to reverse slide advance. In the present invention the timing adapter replaces the remote switch 28. The cycle switch 38 shown in FIG. 2 is discussed hereinafter with reference to the operation of the adapter circuit of FIG. 1.

Referring now to FIG. 1 it is noted that there is no connection from the adapter to the R terminal of the projector and the power of the projector is coupled by way of its female terminals F and C to the corresponding male plugs, shown in FIG. 1 as terminals F and C of the adapter. The adapter generally comprises Triac 42, input switch 44, unijunction transistor 46, capacitors 48 and 50, and associated resistors. Approximately 24 VAC is supplied to terminals C and F from the projector slide advance circuit. Switch 44 which couples from terminal C by way of diode 45 to capacitor 48 is used to enable and disable the timing circuit by removing the power coupled to terminal C from capacitor 48. The diode 45 half-wave rectifies the A-C input voltage and capacitor 48 serves as the input filter capacitor across which approximately 34 volts D-C is developed. The Triac 42 couples from one side of the switch 44 to the F input terminal and includes a gate electrode 43 coupled from unijunction transistor 46. The triac 42 is periodically gated on from the exponential timing circuit including unijunction transistor 46, and when it is gated on causes a forward slide advance of the projector by shorting across terminals C and F.

The resistors 52 and 54 form a voltage divider across capacitor 48 and establish a D-C voltage on the order of +22 volts at the gate electrode 53 of unijunction transistor 46. The anode 55 of transistor 46 must rise to a voltage level approximately 0.6 volts higher than the voltage at the gate electrode in order for the transistor to conduct. When switch 44 is closed and power is applied to the circuit, a level of approximately 22 volts is almost immediately developed at the gate electrode of transistor 46. However the anode electrode of the transistor is initially near ground potential and thus transistor 46 is in a non-conducting state. As capacitor 50 becomes charged by way of resistor 56 and potentiometer 60, which are connected in series with capacitor 50, the anode electrode of transistor 46 becomes increasingly more positive in an exponential manner, and eventually when the voltage at the anode electrode reaches approximately + 22.6 volts transistor 46 conducts and capacitor 50 discharges by way of the anode to cathode junction of transistor 46 and resistor 62 into the gate electrode 43 of Triac 42. Triac 42 conducts and provides an effective short circuit across the input terminals C and F. When this occurs the slide advance solenoid 20, shown in FIG. 2, is energized and power is removed from the terminals C and F by means (not shown) of the projector.

After a predetermined time period Triac 42 can no longer sustain its conduction as capacitors 48 and 50 are discharged sufficiently, and thus Triac 42 turns off. The slide advance solenoid 20 then de-energizes but power is not restored to the terminals C and F of the adapter circuit until the slide advance is completed. This power inhibiting period is about one second long and is controlled by means in the projected itself. In FIG. 2 there is shown a cycle switch 38 which is opened by the slide advance mechanism of the projector. The cycle switch interrupts power to the circuit during a forward slide advance. However, once the slide advance is completed (switch 38 closes) the power is restored to terminals F and C and the timing circuit can again commence charging.

In FIG. 1 it is noted that there is a capacitor 64 connected between the gate electrode 43 of Triac 42 and the F input terminal to the adapter. This capacitor is provided in order to reduce the possibility of transient noise voltages triggering Triac 42.

In order for the Kodak projector slide advance mechanism which is not shown in the drawings but which is of known conventional design, to be properly actuated, the slide advance solenoid 20 should be energized for greater than 25 milliseconds. The Triac 42 is a rather sensitive device with close DC firing gate current tolerances. It typically requires 2 milliamps of gate current to fire in both quadrants with a maximum required gate current of 3 milliamps. Assuming that there is a gate to common (terminal F) voltage drop on the order of 1 volt, the current through resistor 62 drops to 3 milliamps with a voltage on the cathode electrode 57 of transistor 46 of approximately 4 volts. With a time constant for resistor 62 and capacitor 50 of approximately 6.8 milliseconds, the cathode voltage of transistor 46 drops below the maximum gate current to fire Triac 42 in about 1.6 time constants or approximately 11 milliseconds. Hence, the necessary turn-on time for Triac 42 to hold the projector slide advance solenoid energized cannot be solely derived from the discharge current from capacitor 50.

It is preferred that the transistor 46 be a programmable unijunction transistor (PUT). With this type of transistor, when it fires (conducts) both the gate to cathode junction and the anode to cathode junction conduct. Hence, when the gate to cathode junction of transistor 46 is conducting, capacitor 48 discharges through that junction into the gate electrode of Triac 42 by way of resistors 52 and 62. Therefore, the conducting time of Triac 42 is derived from a complex time constant involving the combined discharge currents of capacitors 48 and 50.

The discharge time constant for capacitor 48 through resistors 52 and 62 is approximately 75 milliseconds. However, the discharge current from capacitor 48 through the gate to cathode junction of transistor 46 cannot flow until capacitor 50 has appreciably discharged and a significant potential difference is established across resistor 52. Hence, the initial discharge path for capacitor 48 is by way of resistors 52 and 54 which has a time constant of approximately 218 milliseconds. If potentiometer 50 is reduced to zero ohms, an additional discharge path is also provided through resistor 56 into the anode - cathode junction of transistor 46. However, these discharge time constants are relatively large and thus do not significantly affect the on-conduction time of Triac 42.

When capacitor 48 has discharged to a 1.6 time constant the prime discharge path for capacitor 48 will be established through the gate-cathode junction of transistor 46. Since capacitor 48 has not discharged appreciably at that time a current of approximately 3 milliamps can be considered to exist through resistors 52 and 62 into the gate electrode of Triac 42. When capacitor 48 has discharged to approximately 0.4 time constants the combined current from capacitors 48 and 50 is below the 3 milliamp level and Triac 42 ceases conduction. The total on-time for Triac 42 is approximately 40 milliseconds which is sufficient time to insure proper operation of the slide advance mechanism of the projector. This 40 millisecond interval is obtained by means of an approximate 10 millisecond interval due to capacitor 50, and the remaining total interval is provided by the discharge of capacitor 48 through resistors 52 and 62 into the gate of Triac 42.

As previously indicated when Triac 42 turns off power is removed from the input terminals C and F until the slide advance is actually completed at which time the cycle switch 38 enables application of AC power to terminals C and F. Capacitor 48 then again charges and the cycle repeats. It is noted in FIG. 1 that the potentiometer 60 is a 2-megohm potentiometer that can be adjusted to vary the time constant of capacitor 50 and resistor 56 to provide a different charging time constant for capacitor 50. By increasing the value of potentiometer 60 it takes a longer time period for transistor 46 to start to conduct, and alternatively, by decreasing the value of potentiometer 60 transistor 46 will conduct more periodically and the slide advance will occur at a faster repetition rate.

Figure 4:
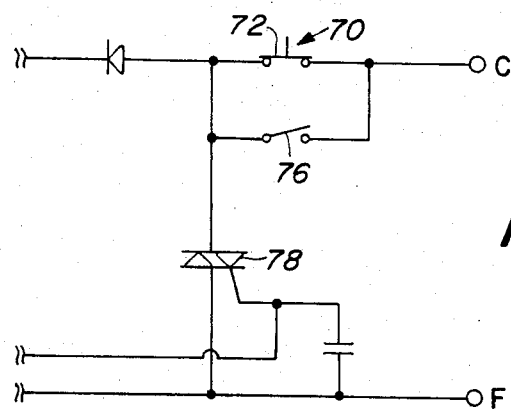
FIG. 4 is a partial circuit diagram showing a modification that can be made to the circuit of FIG. 1 for providing position-responsive inhibiting of the timer means and remote restarting thereof.

Referring again to FIG. 3 there is shown a projector 14 having a carousel 16 associated therewith. In accordance with another aspect of the present invention as indicated in FIG. 3, the adapter 10 has a microswitch 70 associated therewith which has a momentary movable contact 72 which is actuable by a tab 74 fixedly carried on the outer circumference of the carousel 16. FIG. 3 shows the adpater 10 in place in the receptacle 12, and shows the plugs 17 of the adapter in phantom. As the carousel sequentially rotates the contact 72 is eventually actuated by the tab 74 at the desired position, and this microswitch which is shown schematically in FIG. 4 is caused to open. In FIG. 4 the switch 70 is shown in its closed position and a second switch 76 which is preferably remotely disposed from the adapter is shown in its normally open position. In order to couple the remote switch 76 to the adapter, the adapter is shown in FIG. 3 as being provided with at least two remote plugs 19 to which an interconnecting lead (not shown) may be connected. This switching arrangement is shown in FIG. 4 in association with a Triac 78. This Triac may be identical to the Triac 42 shown in FIG. 1.

Once the tab 74 contacts microswitch 70 its contact 72 opens and further slide advancement is prevented as there is no power provided to capacitor 48. Remote switch 76 may then be closed thereby causing power to be applied to capacitor 48. Once the slide advance has occurred the microswitch 72 again assumes the position shown in FIG. 4, and the carousel moves on until another tab is engaged by the microswitch, such as the tab 74A shown in FIG. 3.

The tabs 74 may be temporarily attached to the carousel at the proper elevation and may be either glued in place or removably attached in a guideway or the like.

Having described one embodiment for the adapter of the present invention it should now be obvious that other embodiments are contemplated as falling within the scope of this invention. For example, the adapter has been disclosed as one for use with a Kodak projector. However, it is expected that this adapter can be modified for use, when necessary, with other makes of slide projectors. In some cases it may be advantageous to modify the circuit of FIG. 1 when used with differently designed slide advance mechanisms.

What is claimed is:

1. For a slide projector, an adapter for being received by a connector means of the projector for providing automatic slide advancement, comprising;
   timer means defining a time period,
   means including mating connector means for coupling to said connector means of the projector and for providing power to operate said timer means,
   means for adjusting the duration of said time period,
   and means coupled to said mating connector means and responsive to the termination of said time period for providing a signal to means of said projector to thereby cause a slide advance.

2. The adapter of claim 1 wherein said timer means includes an exponential charging circuit.

3. The adapter of claim 1 wherein said timer means includes a semiconductor control device having three electrodes and a charging circuit including a capacitor coupled to a first electrode of said device for controlling the conduction thereof.

4. The adapter of claim 3 comprising a voltage divider coupled to a second electrode of said device for biasing the second electrode at a relatively fixed voltage.

5. The adapter of claim 4 wherein said signal providing means includes a shunting means responsive to conduction of said semiconductor control device which in turn causes discharge of said capacitor.

6. The adapter of claim 5 wherein said shunting means includes an AC operated semiconductor means having a control electrode coupled to the third electrode of said semiconductor control device.

7. The adapter of claim 6 wherein said AC operated semiconductor means is a TRIAC.

8. The adapter of claim 1 wherein said signal providing means comprises a shunting means responsive to said timer means.

9. The adapter to claim 3 comprising means defining a first discharge path by way of a first pair of electrodes of said control device and a second discharge path by way of a second pair of electrodes of said control device.

10. The adapter of claim 9 wherein both said paths include capacitor means.

11. The adapter of claim 2 wherein said adjusting means includes a potentiometer coupled to said exponential charging circuit.

12. The adapter of claim 1 wherein said power providing means includes a capacitor and rectifier means coupled from a pair of input terminals of said adapter.

13. The adapter of claim 12 comprising shunting means coupled across said terminals and responsive to said timer means.

14. The adapter of claim 13 wherein said pair of input terminals is used to selectively apply AC voltage thereto from said projector.

15. In combination with a carousel-type slide projector, an adapter received by a connector means of the projector for providing automatic slide advancement, comprising;
cyclical timer means defining a predetermined time period,
means for adjusting the duration of said time period,
first switch means responsive to the position of the carousel for interrupting operation of said timer means at at least one position of said carousel,
and second switch means for restarting said timer means.

16. The combination of claim 15 wherein said first switch means is normally closed thereby providing power to said timer means but is opened at at least one position of the carousel.

17. The combination of claim 16 wherein said carousel has at least one tab means disposed thereon for actuating said first switch means at said at least one position.

18. The combination of claim 17 wherein said tab means is removable.

19. The combination of claim 18 wherein said tab means includes a plurality of tabs disposed about said carousel.

20. The combination of claim 15 wherein said timer means includes a semiconductor control device, and said adapter further comprises a shunting means coupled to said connector means and responsive to the termination of said time period for providing a signal to means of said projector to thereby cause a slide advance.

21. The combination of claim 15 wherein said adapter includes a housing and said second switch means is disposed remotely from said adapter housing.

22. The combination of claim 21 wherein said second switch means includes a normally open switch.

* * * * *